United States Patent [19]

Kluger et al.

[11] Patent Number: 4,751,254

[45] Date of Patent: Jun. 14, 1988

[54] PROCESS FOR IN SITU COLORATION OF THERMOSETTING RESINS

[75] Inventors: Edward W. Kluger, Pauline; Patrick D. Moore, Spartanburg; Joe T. Burchette, Mayo, all of S.C.

[73] Assignee: Milliken Research Corporation, Spartanburg, S.C.

[21] Appl. No.: 5,249

[22] Filed: Jan. 20, 1987

[51] Int. Cl.$^4$ .......................................... C08G 18/10
[52] U.S. Cl. .................................. 521/163; 521/162; 521/166; 528/49; 528/70
[58] Field of Search ...................... 521/163, 166, 162; 528/49, 70

[56] References Cited

U.S. PATENT DOCUMENTS

| | | | |
|---|---|---|---|
| 2,827,450 | 3/1958 | Towne et al. | 260/152 |
| 3,994,835 | 11/1976 | Wolfe et al. | 260/2.5 |
| 4,113,729 | 9/1978 | Mohacsi et al. | 260/289 |
| 4,132,840 | 1/1979 | Hugh et al. | 521/167 |
| 4,255,326 | 3/1981 | Giles et al. | 260/152 |
| 4,282,144 | 8/1981 | Weaver et al. | 260/152 |
| 4,284,729 | 8/1981 | Cross et al. | 521/158 |
| 4,301,068 | 11/1981 | Giles et al. | 260/152 |
| 4,301,069 | 11/1981 | Weaver et al. | 260/152 |

FOREIGN PATENT DOCUMENTS

| | | |
|---|---|---|
| 2334169 | 7/1973 | Fed. Rep. of Germany . |
| 1394365 | 5/1975 | United Kingdom . |
| 1583377 | 1/1981 | United Kingdom . |

OTHER PUBLICATIONS

Patrick D. Moore, John W. Miley, and Susan Bates, "New Uses for Highly Miscible Liquid Polymeric Colorants in the Manufacture of Colored Urethane Systems," SPI 27th Annual Technical/Marketing Conference for SPI.

Primary Examiner—Maurice J. Welsh
Attorney, Agent, or Firm—Terry T. Moyer; H. William Petry

[57] ABSTRACT

This invention relates to a process for coloring polyurethane resins during the production of same with reactive colorants derived from novel polyalkoxytrifluoroaniline intermediates. These colorants impart increased brightness in shade for both aromatic and heteroaromatic derivatives and increased resistance to stannous octanoate catalyst over conventional polymeric colorants derived for heteroaromatic compounds. These novel colorants have the structure:

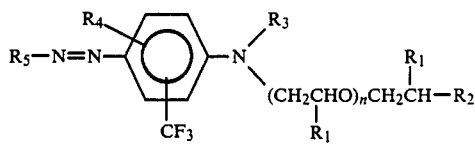

wherein $R_1$ is selected from H, a lower alkyl group containing from 1 to about 10 carbon atoms, $CH_2Cl$, $CH_2OH$, phenyl or

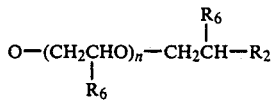

where $R_6$ is H or a lower alkyl group containing from 1 to about 9 carbon atoms; $R_2$ is selected from OH, $NH_2$ or SH; $R_3$ is selected from a lower alkyl group containing from 1 to about 9 carbon atoms, cyanoalkyl, acetoxyalkyl or

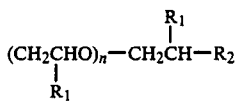

where $R_1$ and $R_2$ are as given above; $R_4$ is H, $CF_3$, a lower alkyl group containing from 1 to about 9 carbon atoms, Cl or Br and n is 0 or an integer form 1 to about 125. $R_5$ is an aromatic or heteroaromatic containing group, said colorants being resistant to stannous octanoate, being characterized as having improved brightness and which have functionality through reactive substituents thereof.

13 Claims, No Drawings

PROCESS FOR IN SITU COLORATION OF THERMOSETTING RESINS

This invention relates to a process for preparing colored polyurethane resins, particularly forms, and to products produced thereby.

It is known that polyurethane resins, produced by the reaction of polyol and an isocyanate may be colored by adding a pigment or dyestuff to the resin. When, however, certain thermoset materials such as polyurethanes are colored with a pigment, the resulting product may be only slightly tinted at normal pigment concentrations, and may thus require larger, undesirable amounts of pigment if a dark hue is to be attained. This phenomenon is particularly apparent in the case of polyurethane foams. On the other hand, if a conventional dyestuff is employed to color the thermoset product, water resistance, oil resistance, and/or resistance to migration of the dyestuff may often be disadvantageously inadequate. When such a dye is used as a coloring agent, it is difficult to prevent bleeding of the dye from the colored resin product. Thermosetting resin products, such as polyurethanes, however, which have been colored with a dyestuff, have certain advantages. Particularly, such colored products may, for instance, possess a clearer hue, and exhibit improved transparency characteristics, both of which are important commercial attributes.

Dyes rather than pigments are preferred for use in coloring polyurethane resins because each molecule of a dye imparts color to the product. Conversely, only the surface molecules of pigment particles impart color. From the standpoint of utilization, then, dyes are more effective than pigments. Due to the above-noted shortcomings of dyes, however, pigments have historically been used extensively.

One definite improvement in prior art techniques is set forth in commonly assigned U.S. Pat. No. 4,284,729 to Cross, et al. in which a liquid polymeric colorants is added to the reaction mixture during production of a thermoset resin. Cross, et al. determined that a liquid, reactive, polymeric colorant could be added before or during the polyaddition reaction to achieve desired coloration of the thermoset resin. The specific polymeric colorant of Cross, et al. has the formula:

R (polymeric constituent—X)$_n$ wherein R is an organic dyestuff radical; the polymeric constituent is selected from polyalkylene oxides and copolymers of polyalkylene oxides in which the alkylene moiety of the polymeric constituent contains 2 or more carbon atoms and such polymeric constituent has a molecular weight of from about 44 to about 1500; X is selected from —OH, —NH$_2$ and —SH, and n is an integer of from about 1 to about 6. The liquid coloring agent is added to the reaction mixture in an amount sufficient to provide the intended degree of coloration of the thermoset resin.

Even though the Cross, et al. polymeric colorant represents vast improvement over prior art techniques, certain problems remain with regard to coloration of polyurethane resins, and foams, in particular. During the complex reactions experienced in producing thermosetting resins, such as polyurethane foams, interactions may occur between certain substituents of the colorant and reactive components of the reaction mixture. In polyurethane foam production specifically, a careful balance must be maintained through the reaction to achieve the desired end product. If a proper balance is not maintained, a product may be produced that is outside the desired product specifications and/or the final product may exhibit poor stability to certain conditions.

Other approaches to coloration of polyurethanes specifically are set forth in U.S. Pat. Nos. 3,994,835 to Wolf, et al. and 4,132,840 to Hugl, et al. Wolf, et al. discloses the addition of dispersions of dyestuffs containing at least one free amino or hydroxyl group capable of reacting with the isocyanate under the conditions of polyaddition and liquids in which the dyes are soluble to an extent less than 2 percent. Hugl, et al. discloses the coloration of polyurethane resins with dyestuffs having the formula

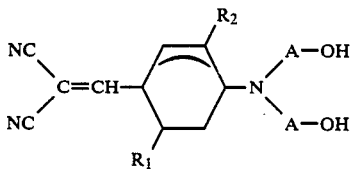

wherein R$_1$ is hydrogen, halogen, optionally substituted C$_1$-C$_4$ alkyl, optionally substituted C$_1$-C$_4$ alkoxy, and optionally substituted C$_1$-C$_4$ alkycarbonylamino and R$_2$ denotes hydrogen, optionally substituted C$_1$-C$_4$ alkyl and optionally substituted C$_1$-C$_4$ alkoxy, while A and B denote optionally branched alkylene chains which can be identical or different and preferably have 2 to 6 carbon atoms.

Also as noted in "New Uses For Highly Miscible Liquid Polymeric Colorants In The Manufacture of Colored Urethane Systems," a paper presented by P. D. Moore, J. W. Miley and S. Bates at the 27th Annual Technical/Marketing Conference for SPI, many extra advantages are attendant to the use of polymeric colorants in polyurethanes beyond the mere aesthetic coloration of same. Specifically, such polymeric colorants can act as important process control indicators which enable one to more closely maintain quality control parameters by visual observation of product color. While the polymeric colorants of Moore, et al. are of the type referred to in the aforementioned Cross, et al. patent, like advantages may also be realized from polymeric colorants as employed in the process of the present invention. In fact, certain of the Cross, et al. colorants encounter adverse interactions in the production of polyurethane foam which are not encountered in practice of the process according to the present invention. Particularly, it has been determined that while all of the Cross, et al. polymeric colorants may be successfully employed in the coloration of thermoset resins generally, certain of the colorants fail in the production of polyurethane foams where tin catalysts and flame retardant chemicals are present.

The process of in situ coloration of polyurethane resins according to the present invention thus represents improvement over the known prior art. Certain known prior art discloses dyestuffs that are similar in chemical structure to certain of those employed in the present invention, e.g., U.S. Pat. Nos. 2,827,450; 4,301,068; 4,113,721; 4,282,144; 4,301,069; 4,255,326; British Pat. Nos. 1,583,377; and 1,394,365; and German Offenlegungsschrift No. 2,334,169. Likewise the above prior art discloses techniques for coloration of polyurethane resins. None of the known prior art, however, teaches or suggests the use of thiophene based, polymeric colorants for in situ coloration of thermosetting resins as taught herein.

A need, therefore, continues to exist for a coloring agent which has excellent water resistance, oil resistance and/or bleeding resistance, and which at the same time may be easily incorporated into the reaction mixture without adverse interaction with components of the reaction mixture. Accordingly, it would be highly desirable to provide a process for preparing colored thermosetting resin products in which the coloring agent has the foregoing advantages. Briefly, the present invention combines the very desirable characteristics of high color yields of dyes with the non-migratory properties of pigments which result, overall, in a product which is superior to both in terms of cost effectiveness and properties of the cured polymer system. The present invention provides a process whereby the above advantages may be achieved as will hereinafter become more apparent.

According to the present invention a process is provided for coloring polyurethane resins produced by the polyaddition reaction in a reaction mixture of a polyol with an isocyanate, which comprises adding to the reaction mixture before or during the polyaddition reaction a reactive coloring agent suitable for incorporation in the resin with the formation of covalent bonds, said coloring agent having the formula:

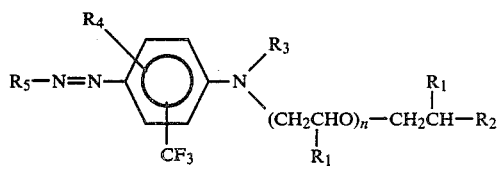

wherein $R_1$ is selected from H, a lower alkyl group containing from 1 to about 10 carbon atoms, $CH_2Cl$, $CH_2Br$, $CH_2OH$, phenyl or

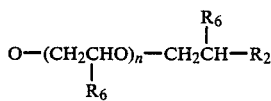

where $R_6$ is H or a lower alkyl group containing from 1 to about 9 carbon atoms; $R_2$ is selected from OH, $NH_2$ or SH; $R_3$ is selected from a lower alkyl group containing from 1 to about 9 carbon atoms, cyanoalkyl, acetoxy-alkyl or

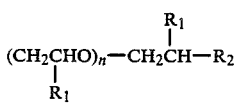

wherein $R_1$ and $R_2$ are as given above; $R_4$ is H, $CF_3$, a lower alkyl group containing from 1 to about 9 carbon atoms, Cl or Br; $R_5$ is an aromatic or heteroaromatic containing group, and n is 0 or an integer from 1 to about 125.

Colorants used in the process of the present invention are preferably liquid materials at ambient conditions of temperature and pressure, and if not, are soluble in reactants of the process.

In order to avoid adverse interactions during production of the polyurethane resin, the presence on the aromatic or heteroaromatic ring of certain substituents such as $NO_2$, NO, $NH_2$, NHR (where R is alkyl or aryl), SH, OH, $CONH_2$, $SO_2NH_2$, as well as hydrogen except as specified above should be avoided.

The reactive substituents for colorants employed in the process of the invention may be any suitable reactive substituent that will accomplish the objects of the present invention. Typical of such reactive substituents which may be attached to the substituted fluoromethyl aniline radical are the hydroxyalkylenes, polymeric epoxides, such as the polyalkylene oxides and copolymers thereof. Polyalkylene oxides and copolymers of same which may be employed to provide the colorant of the present invention are, without limitation, polyethylene oxides, polypropylene oxides, polybutylene oxides, copolymers of polyethylene oxides, polypropylene oxides and polybutylene oxides, and other copolymers including block copolymers, in which a majority of the polymeric substituent is polyethylene oxide, polypropylene oxide and/or polybutylene oxide. Further, such polymeric substituents generally have an average molecular weight in the range of from about 44 to about 2500, preferably from about 88 to about 11,000, but should not be so limited.

Our novel colorants for use in the process of the present invention can have aromatic or heteroaromatic diazo components given by the general formulas I–IV:

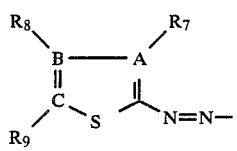

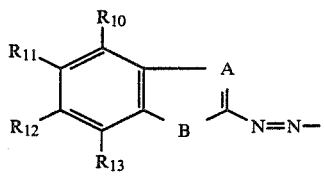

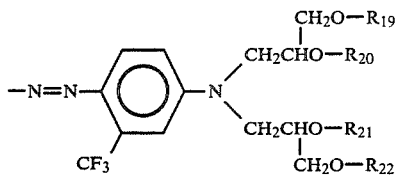

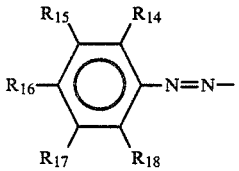

wherein $R_8$-$R_{18}$ are selected from hydrogen, halogen, trifluoromethyl, alkyl, oxyalkyl, oxyaryl, sulfonamidoalkyl, sulfonamidoaryl, sulfonamidodialkyl, amidoalkyl, amidodialkyl, amidoaryl, amidodiaryl, thioalkyl and thioaryl; and $R_{19}$-$R_{20}$ are selected from polyalkylene oxide, copolymers of polyalkylene oxides, and hydroxyalkylenes; and A, B, or C is carbon or nitrogen.

A most preferred reactive colorant for use in the process of the present invention has the formula:

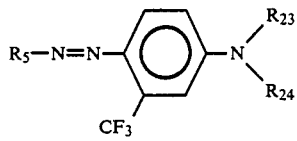

wherein $R_5$ is as defined before and $R_{23}$ or $R_{24}$ are selected from polyalkylene oxide, copolymers of polyalkylene oxides, and hydroxyalkylenes.

Any suitable procedure may be employed to produce these novel colorants for use in the process of the present invention whereby the reactive substituent, or substituents, are coupled to an organic dyestuff radical. For example, the procedure set forth in U.S. Pat. No. 3,157,633, incorporated herein by reference, may be employed. Further, it may be desirable to use an organic solvent as the reaction medium since the reactive substituent is preferably in solution when coupled to the organic dyestuff radical. Any suitable organic solution, even an aqueous organic solution, may be employed. The particular shade of the colorant will depend primarily upon the particular dyestuff radical selected. A large variety of colors and shades may be obtained by blending two or more colorants. Blending of the colorants of the present invention can be readily accomplished especially if the colorants are polymeric materials having substantially identical solubility characteristics, which are dictated by the nature of the polymeric chain. Therefore, according to a preferred embodiment the liquid polymeric colorants are in general soluble in one another, and are also in general completely compatible with each other.

For example, the colorants for use according to the present invention may be prepared by converting a dyestuff intermediate containing a primary amino group into the corresponding reactive compound, and employing the resulting compound to produce a colored product having a chromophoric group in the molecule. In the case of diazo dyestuffs, this may be accomplished by reacting a primary trifluoromethyl aromatic amine with an appropriate amount of an alkylene oxide or mixtures of alkylene oxides, such as ethylene oxide, propylene oxide, or even butylene oxide, according to procedures well known in the art.

Once the reactive coupler is produced along the lines described above, same can be reacted with the aromatic or heteroaromatic derivatives as set forth in the Examples hereinafter. As can be seen from the Examples, the colorant form includes liquids and oils, all of which may be successfully employed in the process of the present invention. According to the process of the invention, the reactive colorant may be incorporated into the resin by simply adding it to the reaction mixture or to one of the components of the reaction mixture before or during the polyaddition reaction. For instance, for coloration of polyurethane resin, the colorant may be added to the polyol or even in some instances to the polyisocyanate component of the reaction mixture either before or during polyurethane formation. The subsequent reaction may be carried out in the usual manner, i.e., in the same way as for polyurethane resins which are not colored.

The process of the present invention is quite advantageous for the production of polyurethane foams in which several reactions generally take place. First in isocyanate such as toluene diisocyanate is reacted with a polyol such as polypropylene glycol in the presence of heat and suitable catalyst. If both the isocyanate and the polyol are difunctional, a linear polyurethane results, whereas should either have functionalities greater than two, a cross-linked polymer will result. If the hydroxylic compound available to react with the -NCO group is water, the initial reaction product is a carbamic acid which is unstable and breaks down into a primary amine and carbon dioxide.

Since excess isocyanate is typically present, the reaction of the isocyanate with the amine generated by decarboxylation of the carbamic acid occurs, and if controlled, the liberated carbon dioxide becomes the blowing agent for production of the foam. Further, the primary amine produced reacts with further isocyanate to yield a substituted urea affords strength and increased firmness characteristics to the polymer.

In general amine and tin catalysts are used to delicately balance the reaction of isocyanate with water, the blowing reaction, and the reaction of isocyanate with polymer building substituents. If the carbon dioxide is released too early, the polymer has no strength and the foam collapses. If polymer formation advances too rapidly a closed cell foam results which will collapse on cooling. If the colorant or another component reacts to upset the catalyst balance poorly formed foam will result.

Additionally, the substituted urea reacts with excess isocyanate, and the urethane itself reacts with further isocyanate to cross link the polymer by both biruet and allophonate formation. Foams colored by the present process may be soft, semi-rigid, or rigid foams, including the so-called polyurethane integral skin and microcellular foams.

Coloring agents suitable for use in the process of the present invention are reactive coloring agents, and may be added to the reaction mixture, or to one of the components thereof. When in liquid form, colorants of the present invention may be added as one or more of the components of the reaction mixture. Conversely when in powder form, the colorants are first added to one of the reactive components and are carried thereby, or conversely are dissolved in a solvent carrier and added as a separate component. Obviously liquids have significant processing advantages over solids and may, if desired, be added directly to the reaction mixture wherefore no extraneous nonreactive solvent or dispersing agent is present. The present process may, therefore, provide unusual and advantageous properties in the final thermoset resin product.

Polyurethane products which may be colored according to the process of the present invention are useful for producing shaped products by injection molding, extrusion or calendering and may be obtained by adding the coloring agent to the polyol or diol component of the reaction mixture, or to one of the other components, although addition to the polyol component is preferred. The polyols may be polyesters which contain hydroxyl groups, in particular reaction products of dihydric alcohols and dibasic carboxylic acids, or polyethers which contain hydroxyl groups, in particular products of the addition of ethylene oxide, propylene oxide, styrene oxide or epichlorohydrin to water, alcohols or amines, preferably dialcohols. The coloring agent may also be admixed with the so-called chain extending diols, e.g., ethylene glycol, diethylene glycol and butane diol. In general, it is desirable not to use more than about 20 percent by weight of coloring agent based on the weight of polyol. In most cases very strong colorations are produced with a small proportion of the coloring agent. For example, from about 0.1 to about 5 percent, preferably 0.5 to 2 percent by weight liquid coloring agent may be utilized based on the weight of polyol.

The preferred reactive colorants used in the process of the invention may be soluble, for instance, in most polyols which would be used in polyurethanes, and in themselves. This property may be particularly valuable for three reasons. First, this solubility may permit rapid mixing and homogeneous distribution throughout the resin, thus eliminating shading differences and streaks when properly mixed. Second, the colorant may have no tendency to settle as would be the case with pigment dispersions. Third, it is possible to prepare a blend of two or more colors which provides a wide range of color availability.

The reactive coloring agents used in the present process may also be of considerable value in reaction injection molding (RIM) applications. The RIM process is a method of producing molded urethanes and other polymers wherein the two reactive streams are mixed while being poured into a mold. Upon reaction, the polymer is "blown" by chemicals to produce a foamed structure. This process may be hindered by the presence of solid particles, such as pigments. The present invention may not cause this hindrance because there are no particles in the system and the colorant becomes part of the polymer through reaction with one of the components.

INTRODUCTION TO EXAMPLES

The diazo compounds, the preparation of which is set forth in Examples 1 through 4 and the structures of which are shown in Tables 1 through 4, fall into four main categories of compounds, the general structures of which are set forth below along with corresponding Example numbers and Table numbers:

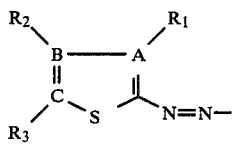

TABLE 1, EXAMPLE 1 (Entries 1 through 36)

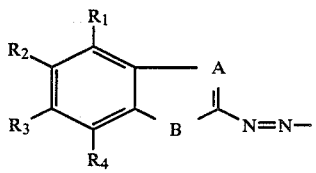

TABLE 2 EXAMPLE 2 (Entries 1 through 26)

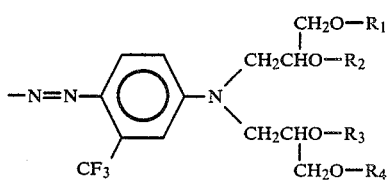

TABLE 3, EXAMPLE 3 (Entries 1 through 4)

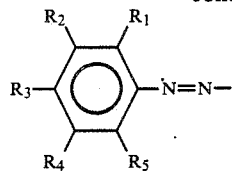

TABLE 4, EXAMPLE 4 (Entries 1 through 13)

EXAMPLE 1

Two hundred grams of 85% phosphoric acid, 25 grams of 98% sulfuric acid, and 4 drops of 2-ethylhexanol were added to a 500 cc flask, after which the mixture was cooled and 16.4 grams of 2-amino-4-methyl-2.5-dicyanothiophene was added to the flask. The mixture was then further cooled to below 0° C. after which 38 grams of 40% nitrosyl sulfuric acid were added while maintaining the temperature below 0° C. After three hours the mixture gave a positive nitrite test and 2 grams of sulfamic acid was added and a vacuum pulled. A negative nitrite test was evident after one further hour.

A 2000 cc beaker was charged with 63.1 grams of m-trifluoromethylaniline 10EO, 200 grams of ice-water and 4 grams of urea. This mixture was cooled to below 0° C. The diazo solution from the flask was added dropwise to the beaker over about 30 minutes, maintaining the temperature below 10° C. The resulting mixture was stirred for several hours and allowed to stand overnight, after which 244 grams of sodium hydroxide (50%) was added to neutralize excess acid to a pH of about 7. The resulting product was then dissolved in methylene chloride, washed four times and then dried over magnesium sulfate. The methylene chloride solution was then filtered and stripped to yield a violet oil. The structure for the resultant compound is set forth in Entry 1 of Table 1 below. A wide variety of related compounds were prepared using the same general procedure set forth in Example 1 and are represented by Entries 2 through 36 of Table 1.

The following abbreviations are utilized in the following tables: EO=ethylene oxide; PO=propylene oxide. Also where numbers are separated by diagonals, e.g., 2/15/5, such refers to moles EO/moles PO/moles EO. Unless otherwise indicated, the polyalkyleneoxy groups are hydroxyl terminated.

TABLE 1

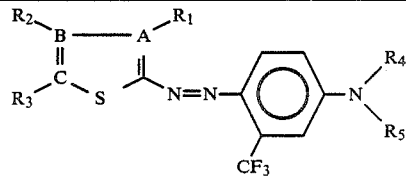

| EN-TRY # | A | B | C | $R_1$ | $R_2$ | $R_3$ | $R_4R_5$ |
|---|---|---|---|---|---|---|---|
| 1 | C | C | C | CN | $CH_3$ | CN | 10EO |
| 2 | C | C | C | CN | $CH_3$ | CN | 11EO |
| 3 | C | C | C | CN | $CH_3$ | CN | 12EO |
| 4 | C | C | C | CN | $CH_3$ | CN | 2EO |
| 5 | C | C | C | CN | $CH_3$ | CN | 20EO |
| 6 | C | C | C | CN | $CH_3$ | CN | 22.5EO |
| 7 | C | C | C | CN | $CH_3$ | CN | 25EO |
| 8 | C | C | C | CN | $CH_3$ | CN | 27.5EO |
| 9 | C | C | C | CN | $CH_3$ | CN | 30EO |
| 10 | C | C | C | CN | $CH_3$ | CN | 2EO/ |

TABLE 1-continued

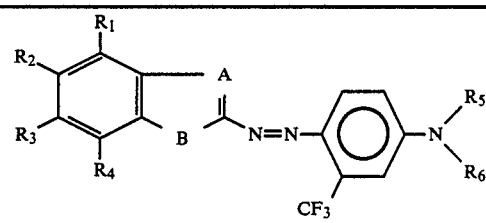

| EN-TRY # | A | B | C | R₁ | R₂ | R₃ | R₄R₅ |
|---|---|---|---|---|---|---|---|
| 11 | C | C | C | CO₂CH₃ | CH₃ | CO₂CH₃ | 10PO/6EO |
| 12 | C | C | C | CO₂C₂H₅ | CH₃ | CO₂C₂H₅ | 10EO |
| 13 | C | C | C | CO₂CH₃ | CH₃ | CO₂C₂H₅ | 10EO |
| 14 | C | C | C | CO₂C₂H₅ | CH₃ | CN | 10EO |
| 15 | C | C | C | CN | CH₃ | CO₂C₂H₅ | 10EO |
| 16 | C | C | C | COCH₃ | CH₃ | CO₂C₂H₅ | 10EO |
| 17 | C | C | C | CO₂C₂H₅ | CH₃ | CONHC₆H₅ | 10EO |
| 18 | C | C | C | CO₂C₂H₅ | H | C₆H₅ | 10EO |
| 19 | C | C | C | CN | —(CH₂)₄— | | 10EO |
| 20 | C | C | C | CO₂C₂H₅ | —(CH₂)₄— | | 10EO |
| 21 | C | C | C | CN | CH₃ | CN | 2EO |
| 22 | C | C | C | CN | —(CH₂)₄— | | 2EO |
| 23 | C | C | C | CO₂C₂H₅ | CH₃ | CO₂C₂H₅ | 2EO |
| 24 | C | C | C | CO₂CH₃ | CH₃ | CO₂CH₃ | 2EO |
| 25 | C | C | C | CO₂C₂H₅ | —(CH₂)₄— | | 2EO |
| 26 | C | C | C | CO₂CH₃ | H | COCH(CH₃)₂ | 2EO |
| 27 | C | C | C | CO₂NHC₂H₅OH | H | COCH(CH₃)₂ | 2EO |
| 28 | C | C | C | CN | CH₃ | CH₃ | 10EO |
| 29 | N | C | C | — | H | H | 10EO |
| 30 | N | C | C | — | CH₃ | H | 10EO |
| 31 | N | C | C | — | C₆H₅ | H | 10EO |
| 32 | N | C | N | — | C₆H₅ | — | 2EO/10PO/6EO |
| 33 | N | C | N | — | C₂H₅ | — | 10EO |
| 34 | N | C | N | — | C₆H₅ | — | 2EO |
| 35 | N | N | C | — | — | SC₂H₅ | 10EO |
| 36 | N | N | C | — | — | C₂H₅ | 10EO |

EXAMPLE 2

The procedure of example 1 was followed with the exception of amounts of reactants and the particular diazo component and coupler employed, all of which are specified below:

549 grams of 85% phosphoric acid
150 grams of 98% sulfuric acid
3 drops of 2-ethylhexanol defoamer
49.2 grams of 4-methyl-2-aminobenzothiazole
105 grams of 40% nitrosyl sulfuric acid
9 grams of sulfamic acid
189 grams of m-trifluoromethylaniline —10EO
200 grams of ice
200 grams of water
12 grams urea.

The excess acid was neutralized with 780 grams of 50% sodium hydroxide, the bottom salt layer of the reaction mixture was removed hot and the product was dissolved in methylene chloride, washed four times and then dried over magnesium sulfate. The methylene chloride solution was then filtered and stripped to yield an orange oil.

The structure for the product compound is set forth in Entry 1 of Table 2 below. A wide variety of related compounds were prepared using the same general procedure set forth in Example 2 and are represented by Entries 2 through 26 of Table 2.

TABLE 2

| Entry # | A | B | R₁ | R₂ | R₃ | R₄ | R₅R₆ |
|---|---|---|---|---|---|---|---|
| 1 | N | S | CH₃ | H | H | H | 10EO |
| 2 | N | S | CH₃ | H | H | H | 2EO/10PO/6EO |
| 3 | N | S | Cl | H | H | H | 20EO |
| 4 | N | S | Cl | H | H | H | 2EO/10PO/6EO |
| 5 | N | S | Cl | H | H | H | 2EO/15PO/5EO |
| 6 | N | S | Cl | H | H | H | 2EO/12PO/18EO |
| 7 | N | S | Cl | H | H | H | 10EO |
| 8 | N | S | Cl | H | H | H | 22.5EO |
| 9 | N | S | Cl | H | H | H | 25EO |
| 10 | N | S | Cl | H | H | H | 27.5EO |
| 11 | N | S | Cl | H | H | H | 30EO |
| 12 | N | S | Cl | H | H | H | 2EO |
| 13 | N | S | H | H | H | H | 10EO |
| 14 | N | S | H | H | H | H | 20EO |
| 15 | N | S | H | H | H | H | 2EO |
| 16 | N | S | H | H | H | H | 2EO/10PO/6EO |
| 17 | N | S | CH₃ | H | Br | H | 2EO/10PO/6EO |
| 18 | N | S | Br | H | OCH₃ | H | 2EO/10PO/6EO |
| 19 | N | S | Br | H | Cl | H | 2EO/10PO/6EO |
| 20 | N | S | Br | (Cl) | Cl | (Cl) | 2EO/10PO/6EO |
| 21 | N | S | Cl | H | Cl | H | 2EO/10PO/6EO |
| 22 | N | S | H | H | SO₂CH₃ | H | 2EO/10PO/6EO |
| 23 | N | S | Br | H | SO₂CH₃ | H | 2EO/10PO/6EO |
| 24 | N | S | H | H | CH₃ | H | 2EO/10PO/6EO |
| 25 | N | S | H | H | OCH₃ | H | 2EO/10PO/6EO |
| 26 | CCO₂C₂H₅ | S | H | H | H | H | 2EO/15PO/5EO |

EXAMPLE 3

The procedure of Example 1 was followed with the exception of amount of reactants and the particular diazo component and coupler employed, all of which are specified below:
200 grams of 85% phosphoric acid
25 grams of 98% sulfuric acid
4 drops of 2-ethylhexanol defoamer
16.4 grams of 2-amino-4-methyl-2,5-dicyanothiophene
38 grams of 4% nitrosyl sulfuric acid
2 grams of sulfamic acid
78 grams of m-trifluoromethylaniline 2PDO/10EO
80 grams of ice
80 grams of water
8 grams of urea.

The excess acid was neutralized with 244 grams of 50% sodium hydroxide, the bottom salt layer of the reaction mixture was removed hot and the product was dissolved in methylene chloride, washed four times and then dried over magnesium sulfate. The methylene chloride solution was then filtered and stripped to yield a violet oil.

The structure for the product compound is set forth in Entry 1 of Table 3 below. A wide variety of related compounds were prepared using the same general procedure set forth in Example 3 and are represented in Entries 2 through 4 of Table 3.

TABLE 3

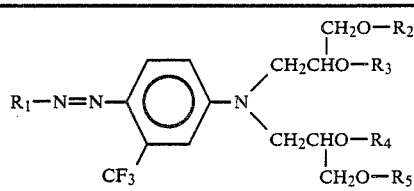

| Entry # | $R_1$ | $R_2, R_3, R_4, R_5$ | Color |
|---|---|---|---|
| 1 | CH3-thiophene-CN/NC (2,5-dicyano-4-methylthiophene) | 10EO | Violet |
| 2 | CH3-thiophene-CN/NC | 11EO | Violet |
| 3 | CH3-thiophene-CN/NC | 12EO | Violet |
| 4 | 2-chloro-benzothiazole | 10EO | Red |

EXAMPLE 4

The procedure of Example 1 was followed with exception of amounts of reactants and the particular diazo component and coupler employed, all of which are specified below:
50 grams of ice
70 grams of 70% sulfuric acid
3 drops of 2-ethylhexanol defoamer
20.6 grams of 2-chloro-4-methylsulfonylaniline
50 grams of 40% nitrosyl sulfuric acid
63 grams of m-trifluoromethylaniline 10 EO
130 grams of ice water
4 grams of urea.

The excess acid was neutralized with 150 grams of 50% sodium hydroxide, the bottom salt layer of the reaction mixture was removed hot and the product was dissolved in methylene chloride, washed four times and then dried over magnesium sulfate. The methylene chloride solution was then filtered and stripped to yield an orange oil.

The structure for the product compound is set forth in Entry 1 of Table 4 below. A wide variety of related compounds were prepared using the same general procedure set forth in Example 4 and are represented by Entries 2 through 13 of Table 4.

TABLE 4

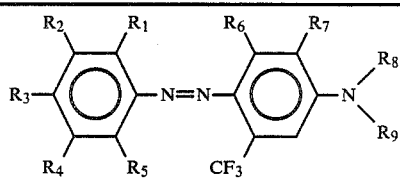

| Entry # | $R_1$ | $R_2$ | $R_3$ | $R_4$ | $R_5$ | $R_6$ | $R_7$ | $R_8 R_9$ |
|---|---|---|---|---|---|---|---|---|
| 1 | Cl | H | $SO_2$ | H | H | H | H | 10EO |
| 2 | Cl | H | $SO_2CH_3$ | H | H | H | H | 11EO |
| 3 | Cl | H | $SO_2CH_3$ | H | H | H | H | 12EO |
| 4 | Cl | H | $SO_2CH_3$ | H | H | H | Cl | 10EO |
| 5 | $CF_3$ | H | Cl | H | H | H | Cl | 10EO |
| 6 | Cl | H | H | $CF_3$ | H | H | H | 10EO |
| 7 | H | H | $SO_2N(C_2H_4OH)_2$ | H | H | H | H | 10EO |
| 8 | H | H | $CH_3$ | $SO_2-N(C_6H_5)-C_2H_5$ | H | H | H | 12EO |

TABLE 4-continued

Structure:
$R_2, R_1$ on one benzene ring with $R_3, R_4, R_5$; connected via $N=N$ to another ring with $R_6, R_7, CF_3$ and $N(R_8)(R_9)$.

| Entry # | R₁ | R₂ | R₃ | R₄ | R₅ | R₆ | R₇ | R₈R₉ |
|---|---|---|---|---|---|---|---|---|
| 9 | Cl | H | H | H | Cl | H | H | 10EO |
| 10 | Cl | H | H | H | Cl | H | H | 11EO |
| 11 | Cl | H | Cl | H | Cl | H | H | 11EO |
| 12 | Cl | H | SO₂CH₃ | H | H | H | Cl | 12EO |
| 13 | Cl | H | H | H | Cl | H | Cl | 12EO |

EXAMPLE 5

The procedure of Example 1 was followed with the exception of amounts of reactants and the particular diazo component and coupler employed, all of which are specified below:
150 grams of ice
70 grams of 70% sulfuric acid
3 drops of 2-ethylhexanol defoamer
20.6 grams of 2-chloro-4-methylsulfonylaniline
50 grams of 40% nitrosyl sulfuric acid
3 grams of sulfamic acid
110 grams of m-toluidine 2EO/10PO/6EO
130 grams of ice water
4 grams of urea.

The excess acid was neutralized with 150 grams of 50% sodium hydroxide, the bottom salt layer of the reaction mixture was removed hot and the product was dissolved in methylene chloride, washed four times and then dried over magnesium sulfate. The methylene chloride solution was then filtered and stripped to yield an orange oil.

The structure for the resultant compound is given below.

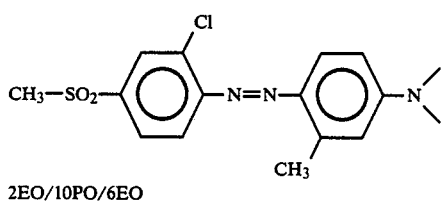

2EO/10PO/6EO

A variety of additional compounds were prepared using essentially the same procedure, and the structures for these compounds are summarized by Entries 1 through 7 of Table 5.

TABLE 5
COMPARATIVE COLORANTS

| Entry # | R₁ | R₂ | R₃ | R₄ | R₅R₆ |
|---|---|---|---|---|---|
| 1 | CH₃ | H | H | CH₃ | 2EO/15PO/5EO |

TABLE 5-continued
COMPARATIVE COLORANTS

| Entry # | R₁ | R₂ | R₃ | R₄ | R₅R₆ |
|---|---|---|---|---|---|
| 2 | H | H | OCH₃ | CH₃ | 10EO |
| 3 | OCH₃ | H | H | OCH₃ | 12EO |
| 4 | CH₃ | H | H | Cl | 2EO/10PO/5EO |
| 5 | Cl | H | H | Cl | 2EO/15PO/5EO |
| 6 | Cl | H | Cl | H | 2EO/15PO/5EO |
| 7 | H | Cl | Cl | H | 2EO/15PO/5EO |

EXAMPLE 6

This example illustrates the method by which the novel compounds of this invention along with some conventional polymeric colorants are incorporated into polyurethane foam, a common commercial thermosetting resin.

A masterbatch for the production of polyerethane foam was prepared by adding 3000 grams of Niax-16-56 (a 3000 molecular weight triol available from Union Carbide), 125.1 grams of water, and 7.8 grams of Dabco 33LV (amine catalyst available from Air Products) to a one gallon plastic jug, mixed well and stored at 65° F. for further use.

A polyether polyurethane foam (control) was produced as follows. One hundred and four grams of the masterbatch prepared above were added to a 400 milliliter disposable beaker, and one gram of a reactive colorant as taught herein was added thereto along with one milliliter of Liquid Silicone L-520 available from Union Carbide. The mixture was stirred in a blender for 25–30 seconds, 0.20 milliliters of T-9 (stannous octanoate catalyst) added thereto from a syringe, and stirred for an additional 5–8 seconds. Thereafter, 46 milliliters of toluene diisocyanate were added to the beaker and the mixture stirred for six seconds. A blended, homogenous mixture resulted and was poured into an 83 ounce paper bucket. The mixture foamed, and after the foam stopped rising, was cured in an oven at 130° C. for 15 minutes.

EXAMPLE 7

Conventional polymeric colorants of Example 5 were compared with the compounds of the present invention for stability of the colorants to the stannous octanoate catalyst.

The following procedure was used. First the color value for the colorants tested was determined by placing about 0.10 to 0.15 grams of colorant into a 100 milliliter volumetric flask and adding approximately 40 to 50 milliliters of methanol. The flask was swirled until the colorant dissolved in the methanol, after which excess methanol was added to the 100 milliliter mark on the flask. The flask was stoppered and the contents were mixed and shaken. Exactly 2.0 milliliter of the solution of the colorant in methanol was then added to a separate like flask and the flask was filled with methanol to the 100 milliliter mark, stoppered and shaken.

A Beckman DU-7 Spectrometer was zeroed with methanol, filled with the test solution, and the solution was scanned from 300 to 750 mm. The maximum absorbance was recorded. Color value is obtained by multiplying the sample weight by 0.2 and dividing the product obtained into the maximum absorbance value.

In the case of liquid phase colorant, the colorant to be tested was then added to a 50 milliliter volumetric flask.

In order to correct for varying color strengths the amount of colorant added was determined by the following formula:

5/(Color value)=number of grams added.

Then 35 milliliters of 2-ethoxyethylether or 2-methoxylethylether were added to dissolve the colorant. Further solvent was then added to bring the total contents to the 50 milliliter mark. The flask was stoppered and shaken. Exactly 2.0 milliliters of this solution were transferred to a further 50 milliliter flask and diluted to the 50 milliliter mark with one of the solvents.

In the case of solid colorant to be tested colorant to be tested was added to a 100 ml volumetric flask, In order to correct for varying color strengths the amount of colorant added was determined as follows:

5/2 (color value)=number of grams added.

Then 35 ml of 2-ethoxyethyl-ether or 2-methoxyethylether solvent was added to dissolve the colorant. An additional amount of solvent was added to bring the level in the volumetric flask to the 100 ml mark; a stopper was inserted, and the contents of the flask were mixed well by shaking. Exactly 4.0 ml of this solution were then transferred to another 100 ml volumetric flask and diluted to the 100 ml mark with solvent.

A solution of T-9 (stannous octanoate) was prepared with minimum air exposure by dissolving 0.70 gram of stannous octanoate in seven milliliters of solvent in a vial which was kept sealed between runs. The Beckman spectrometer was set up for repetitive scanning. Two milliliters of colorant solution (either solid or liquid as described above) were placed into a vial with 2.0 milliliters of the tin catalyst solution and mixed well. The mixture was then transferred to the cell of the spectrometer which was capped and quickly placed into the spectrometer (not more than 20 to 30 seconds elapsed time). Five repetitive scans were then made for each colorant sample at three intervals. The percentage loss after fifteen minutes (5 scans) was measured from initial absorbance and last absorbance.

Tables 6 and 7 illustrate the effect of tin stability towards a given colorant.

TABLE 6
EFFECT OF STANNOUS OCTANOATE CATALYST ON COLORANT STABILITY

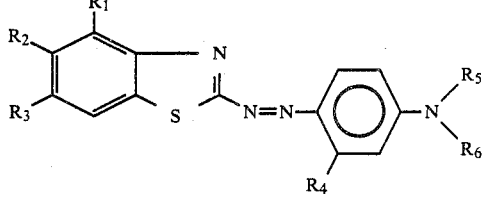

| Entry # | $R_1$ | $R_2$ | $R_3$ | $R_4$ | $R_5R_6$ | % LOSS |
|---|---|---|---|---|---|---|
| 1 | $CH_3$ | H | H | $CH_3$ | 2EO/15PO/6EO | 28.0 |
| 2 | H | H | $OCH_3$ | $CH_3$ | 10EO | 60.8 |
| 3 | $OCH_3$ | H | H | $OCH_3$ | 12EO | 66.7 |
| 4 | $CH_3$ | H | H | Cl | 2EO/10PO/5EO | 85.0 |
| 5 | Cl | H | H | Cl | 2EO/15PO/5EO | 97.8 |
| 6 | Cl | H | Cl | H | 2EO/15PO/5EO | 87.9 |
| 7 | H | Cl | Cl | H | 2EO/15PO/5EO | 100.00 |

TABLE 7
EFFECT OF STANNOUS OCTANOATE CATALYST ON COLORANT STABILITY

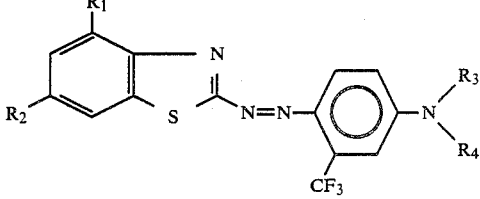

| Entry # | $R_1$ | $R_2$ | $R_3R_4$ | % LOSS |
|---|---|---|---|---|
| 1 | Br | $OCH_3$ | 2EO/10PO/6EO | 1.9 |
| 2 | $CH_3$ | H | 2EO/10PO/6EO | 3.0 |
| 3 | H | H | 2EO/10PO/6EO | 3.3 |
| 4 | $CH_3$ | Br | 2EO/10PO/6EO | 4.9 |
| 5 | Br | Cl | 2EO/10PO/6EO | 9.0 |
| 6 | Cl | H | 2EO/10PO/6EO | 15.0 |

EXAMPLE 8

Conventional polymeric colorants of Example 5 were also studied in order to provide a side-by-side comparison of foam brightness versus the novel compounds of this invention. The colorants were all incorporated into polyurethane foam according to the method described in Example 7. The polyurethane foam samples containing colorants were then compared according to the following procedure:

Slices of each colored polyurethane foam were analyzed using CIELAB coordinates measured by means of a Labscan colorimeter. The psychometric chroma (C*) of each foam sample was calculated according to the following equation:

$$C^* = \sqrt{(a^*)^2 + (b^*)^2}$$

where C* represents chroma or measurement of brightness for a color, a* is a unit measuring the red component of color, and b* is a unit measuring the yellow component of color. For a further discussion see "*Principles of Color Technology,*" 2 Ed. F. W. Bullmeyer and M. Saltzmann.

Tables 8 and 9 illustrate the effect of colorant composition brightness.

TABLE 8
CHROMA DATA

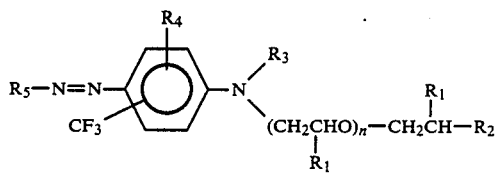

| ENTRY # | $R_1$ | $R_2R_3$ | C* (BRIGHTNESS) |
|---|---|---|---|
| 1 | $CH_3$ | 2EO/10PO/6EO | +56.6 |
| 2 | $CF_3$ | 10EO | +61.3 |

TABLE 9
CHROMA DATA

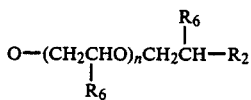

| ENTRY # | $R_1$ | $R_2R_3$ | C* (BRIGHTNESS) |
|---|---|---|---|
| 1 | $CH_3$ | 2EO/15PO/5EO | +34.8 |
| 2 | $CF_3$ | 2EO/12PO/8EO | +36.4 |

As discussed above, while a number of colorants have heretofore been utilized for in situ coloration of polymeric materials, polyurethane foams present somewhat special problems. Specifically, the colorant must be stable to tin catalysts utilized in the production of the urethane included in the polymer.

Instability as to the stannous tin catalysts, result in reduction of the dyestuff leading to significant, if not total, loss of color. Additionally, the foam producing process is also adversely affected. The foam does not rise at a proper rate and does not cure at a fast enough rate. A tacky polyurethane with poor polymer properties results. It is thus important that colorants for polyurethanes be stable to the tin catalysts.

As demonstrated in Example 6, Tables 6 and 7, the novel polymeric colorants of this invention have the advantage of improved tin stability over conventional polymeric colorants which is a desirable and characteristic of the novel colorants of this invention. In fact, some of these colorants are more than 10 times more stable depending on the nature of the substituent involved.

Tables 8 and 9 in Example 8 also demonstrate the effect of improved brightness for a given aromatic or heteroaromatic group of this invention over existing art. Both of these novel compounds have increased chroma or brightness on the order of about 10%.

Having described the present invention in detail it is obvious that one skilled in the art will be able to make variations and modifications thereto without departing from the scope of the present invention. Accordingly, the scope of the present invention should be determined only by the claims appended hereto.

What is claimed is:

1. A process for coloring polyurethane resins made by a polyaddition reaction of a polyol and an isocyanate, which comprises adding to the reaction mixture before or during the polyaddition reaction a reactive coloring agent suitable for incorporation into the resin with the formation of covalent bonds, said coloring agent having the formula:

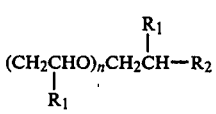

wherein $R_1$ is selected from H, a lower alkyl group containing from 1 to about 10 carbon atoms, $CH_2Cl$, $CH_2Br$, $CH_2OH$, phenyl or $$O-(CH_2CHO)_n CH_2\overset{R_6}{\underset{R_6}{C}}H-R_2$$

where $R_6$ is H or a lower alkyl group containing from 1 to about 9 carbon atoms; $R_2$ is selected from OH, $NH_2$ or SH; $R_3$ is selected from a lower alkyl group containing from 1 to about 9 carbon atoms, cyanoalkyl, acetoxyalkyl or $$(CH_2\underset{R_1}{C}HO)_n CH_2\overset{R_1}{C}H-R_2$$

wherein $R_1$ and $R_2$ are as given above; $R_4$ is H, $CF_3$, a lower alkyl group containing from 1 to about 9 carbon atoms, Cl or BR and n is 0 or an integer from 1 to about 125; and $R_5$ is an aromatic or heteroaromatic containing group, said colorants being resistant to stannous octanoate, being characterized as having improved brightness which have functionality through reactive substituents thereof.

2. The process as defined in claim 1 wherein the polyurethane is a foam.

3. The process as defined in claim 1 wherein the colorant is given by the formula:

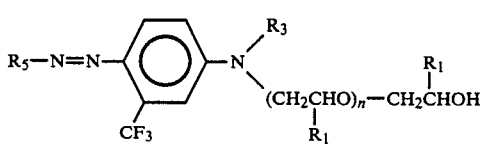

wherein $R_1$, $R_3$, $R_5$ and n have the values set forth in claim 1.

4. The process as defined in claim 1 wherein the colorant is given by the formula:

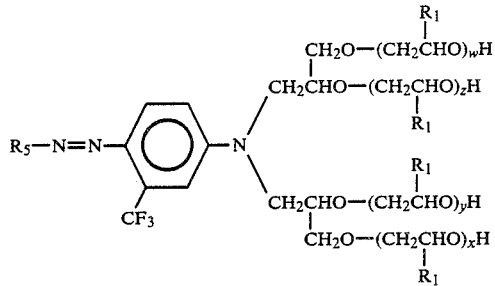

wherein $R_1$ is H or methyl, $R_5$ is as defined in claim 1, and $w+x+y+z$ is a number of from 0 to about 32.

5. The process as defined in claim 1 wherein the polyurethane resin contains a flame retardant.

6. The process as defined in claim 1 wherein the coloring agent is at least one coloring agent selected from coloring agents of the formula

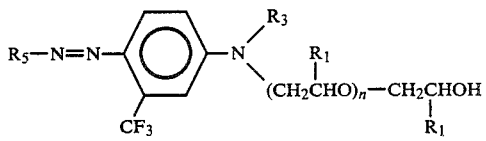

wherein $R_1$ and $R_3$ have the values set forth in claim 1, and wherein $R_5$ is selected from: 2-chloro-4-methylsulfonylphenyl, 3,5-dicyano-4-methylthiophenyl, 4-chlorobenzothiazolyl, 4-methylbenzothiazolyl, 4-phenyl-thiadiazolyl, 2,6-dichlorophenyl, N,N-bis-hydroxyethylsulfonamidophenyl, 3,5-dicarboethoxy-4-methylthiophenyl, 3,5-dicarbomethoxy-4-methylthiophenyl, 3-carboethoxy-4-methyl-5-cyanothiophenyl, 3-carbomethoxy-4-methyl-5-cyanothiophenyl, 3-cyano-4,5-tetramethylene-thiophenyl, 3-carbomethoxy-5-isobutyrylthiophenyl, 3-carboethoxy-4-methyl-5-phenylamidothiophenyl, 3-cyano-4-methyl-5-acetylthiophenyl, 5-ethylthiothiadiazolyl, thiazolyl, 4-methylthiazolyl, 3-carboethoxy-4-methyl-5-cyanothiophenyl, 2-chloro-5-trifluoromethylphenyl, 2-trifluoromethyl-4-chlorophenyl, 2-trifluoromethylphenyl, 4-trifluoromethylphenyl, 3,5-bis-trifluoromethylphenyl.

7. The process as defined in claim 1 wherein the coloring agent is at least one coloring agent selected from coloring agents of the formula:

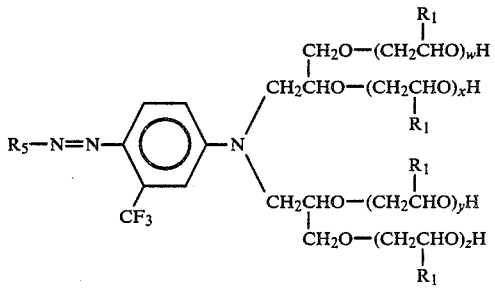

wherein $R_1$ is H or methyl, and $w+x+y+z$ equals 0 to 32; and wherein $R_5$ is selected from: 2-chloro-4-methylsulfonylphenyl, 3,5-dicyano-4-methylthiophenyl, 4-chlorobenzothiazolyl, 4-methylbenzothiazolyl, 4-phenylthiadiazolyl, 2,6-dichlorophenyl, N,N-bishydroxyethylsulfonamidophenyl, 3,5-dicarboethoxy-4-methylthiophenyl, 3,5-dicarbomethoxy-4-methylthiophenyl, 3-carboethoxy-4-methyl-5-cyanothiophenyl, 3-carbomethoxy-4-methyl-5-cyanothiophenyl, 3-cyano-4,5-tetramethylenethiophenyl, 3-carbomethoxy-5-isobutyrylthiophenyl, 3-carboethoxy-4-methyl-5-phenylamidothiophenyl, 3-cyano-4-methyl-5-acetylthiophenyl, 5-ethylthiothiadiazolyl, thiazolyl, 4-methylthiazolyl, 3-carboethoxy-4-methyl-5-cyanothiophenyl, 2-chloro-5-trifluoromethylphenyl, 2-trifluoromethyl-4-chlorophenyl, 2-trifluoromethylphenyl, 3,5-bis-trifluoromethylphenyl.

8. A colored polyurethane resin which comprises the reaction product of a polyol and an isocyanate and which further includes a covalently bound coloring agent having the formula:

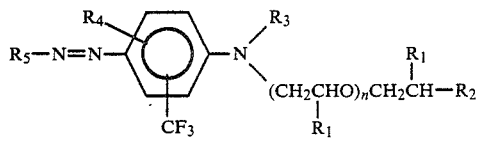

wherein $R_1$ is selected from H, a lower alkyl group containing from 1 to about 10 carbon atoms, $CH_2Cl$, $CH_2Br$, $CH_2OH$, phenyl or

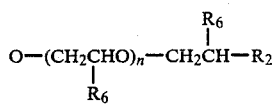

where $R_6$ is H or a lower alkyl group containing from 1 to about 9 carbon atoms, $R_2$ is selected from OH, $NH_2$ or SH; $R_3$ is selected from a lower alkyl group containing from 1 to about 9 carbon atoms, cyanoalkyl, acetoxyalkyl or

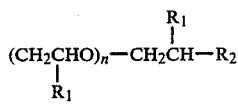

wherein $R_1$ and $R_2$ are as given above; $R_4$ is H, $CF_3$, a lower alkyl group containing from 1 to about 9 carbon atoms, Cl or Br and n is 0 or an integer from 1 to about 125; $R_5$ is an aromatic or heteroaromatic containing group, said colorants being resistant to stannous octanoate, being characterized as having improved brightness and which have functionality through reactive substituents thereof.

9. The colored resin as defined in claim 8 wherein the resin is foamed.

10. The colored resin as defined in claim 8 wherein the coloring agent has the formula:

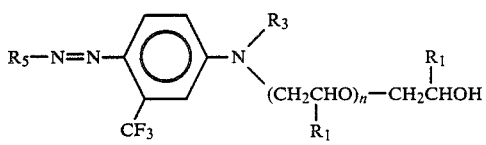

wherein $R_1$ is selected from H, or methyl, $R_3$ is selected from a lower alkyl group containing from 1 to about 9 carbon atoms, cyanoalkyl, acetoxyalkyl or

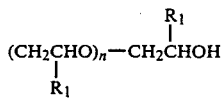

and $R_5$ is an aromatic or heteroaromatic containing group.

11. The colored resin as defined in claim 8 wherein the coloring agent has the formula:

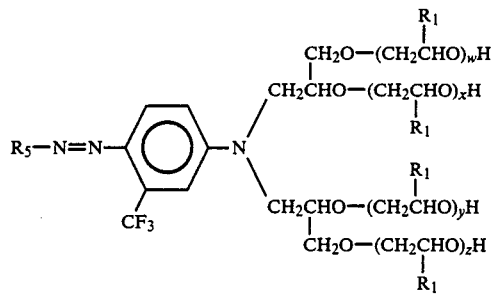

wherein $R_1$ is H or methyl, $R_5$ is an aromatic or heteromatic containing group and $w+x+y+z$ is a number of from 0 to about 32.

12. The colored resin defined in claim 10 wherein $R_5$ is selected from: 2-chloro-4-methylsulfonylphenyl, 3,5-dicyano-4-methylthiophenyl, 4-chlorobenzothiazolyl, 4-methylbenzothiazolyl, 4-phenylthiadiazolyl, 2,6-dichlorophenyl, N,N-bis-hydroxyethylsulfonamidophenyl, 3,5-dicarbomethoxy-4-methylthiophenyl, 3,5-dicarbomethoxy-4-methylthiophenyl, 3-carbomethoxy-4-methyl-5-cyanothiophenyl, 3-carbomethoxy-4-methyl-5-cyanothiophenyl, 3-cyano-4,5-tetramethylenethiophenyl, 3-carbomethoxy-5-isobutyrylthiophenyl, 3-carboethoxy-4-methyl-5-phenylamidothiophenyl, 3-cyano-4-methyl-5-acetylthiophenyl, 5-ethylthiothiadiazolyl, thiazolyl, 4-methylthiazolyl, 3-carboethoxy-4-methyl-5-cyanothiophenyl, 2-chloro-5-trifluoromethylphenyl, 2-trifluoromethyl-4-chlorophenyl, 2-trifluoromethylphenyl, 4-trifluoromethylphenyl, and 3,5-bis-trifluoromethylphenyl.

13. The colored resin defined in claim 11 wherein $R_5$ is selected from: 2-chloro-4-methylsulfonylphenyl, 3,5-dicyano-4-methylthiophenyl, 4-chlorobenzothiazolyl, 4-methylbenzothiazolyl, 4-phenylthiadiazolyl, 2,6-dichlorophenyl, N,N-bis-hydroxyethylsulfonamidophenyl, 3,5-dicarboethoxy-4-methylthiophenyl, 3,5-dicarbomethoxy-4-methylthiophenyl, 3-carboethoxy-4-methyl-5-cyanothiophenyl, 3-carbomethoxy-4-methyl-5-cyanothiophenyl, 3-cyano-4,5-tetramethylenethiophenyl, 3-carbomethoxy-5-isobutyrylthiophenyl, 3-carboethoxy-4-methyl-5-phenylamidothiophenyl, 3-cyano-4-methyl-5-acetylthiophenyl, 5-ethylthiothiadiazolyl, thiazolyl, 4-methylthiazolyl, 3-carboethoxy-4-methyl-5-cyanothiophenyl, 2-chloro-5-trifluoromethylphenyl, 2-trifluoromethyl-4-chlorophenyl, 2-trifluoromethylphenyl, 4-trifluoromethylphenyl, and 3,5-bis-trifluoromethylphenyl.

* * * * *